United States Patent
Sato (12)

(10) Patent No.: US 7,013,405 B2
(45) Date of Patent: Mar. 14, 2006

(54) DATA TRANSFER TIMING SIGNAL APPARATUS AND METHOD OF DATA

(75) Inventor: Yuji Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 634 days.

(21) Appl. No.: 09/820,729

(22) Filed: Mar. 30, 2001

(65) Prior Publication Data

US 2001/0027534 A1    Oct. 4, 2001

(30) Foreign Application Priority Data

Mar. 31, 2000    (JP)    ............................. 2000-096073

(51) Int. Cl.
    *G06F 1/08*    (2006.01)
(52) U.S. Cl. ...................................... 713/501; 713/600
(58) Field of Classification Search ................ 713/400, 713/401, 500, 501, 600; 347/5
See application file for complete search history.

(56) References Cited

U.S. PATENT DOCUMENTS

| | | | | |
|---|---|---|---|---|
| 6,144,242 A | * | 11/2000 | Jeong et al. ................. | 327/269 |
| 6,169,889 B1 | * | 1/2001 | Servilio et al. ............. | 455/296 |
| 6,263,082 B1 | * | 7/2001 | Ishimoto et al. ............... | 380/46 |
| 6,353,906 B1 | * | 3/2002 | Smith et al. ................. | 714/741 |

FOREIGN PATENT DOCUMENTS

JP    11290535 A    * 10/1999

* cited by examiner

*Primary Examiner*—Thuan Du
(74) *Attorney, Agent, or Firm*—Oliff & Berridge, PLC

(57) ABSTRACT

In a data transfer device, a selector selects one of delayed clocks 0 to 3, according to random numbers generated by a random number generating circuit. Output from an output terminal of the selector is an output clock whose timing of transition to a HIGH level or a LOW level is randomly changed. Timing to switch output data to be output from each of flip-flops is also randomly changed. As a result, an energy density at some frequency of electromagnetic wave radiated from a signal lines is not raised, so that radiant noises and crosstalk between signals may be reduced.

13 Claims, 3 Drawing Sheets

DATA TRANSFER TIMING SIGNAL APPARATUS AND METHOD OF DATA

BACKGROUND OF THE INVENTION

1. Field of Invention

The invention relates to a data transfer device that transfers data, via a plurality of signal lines, and a printing apparatus including the data transfer device.

2. Description of Related Art

An apparatus including a data transfer device includes, for example, a serial printer that performs printing using a print head mounted on a carriage reciprocally movable in the main scanning directions of a print paper. In the serial printer, a print control device fixedly disposed in a case and the print head moving together with the carriage are connected by a flat harness. With this structure, digital signals are transmitted from the print control device to the print head, via the flat harness, so that the print control device controls the print head.

In the above-described serial printer, a flat harness that connects the print control device and the print head needs to have enough length to allow the print head to move in the main scanning directions. More specifically, the print head reciprocally moves together with the carriage in the main scanning direction of the print paper, relative to the print control device fixedly disposed in the case. The distance between the print control device and the print head varies between the range when the print control device and the print head become farthest apart and become closest. When the print control device and the print head become most remote, the flat harness needs to have enough length so as not to be in tension. When the print control device and the print head become closest, the flat harness needs to bend flexibly. Therefore, it is also required for the flat harness to have enough flexibility to bend flexibly.

When a plurality of clock signals and data signals are sent to the print head, using such a harness described above, radiant noises may be emitted from the flat harness. In addition, crosstalk between the signals may occur.

To solve the above-described problems, the flat harness may have a thin shield attached thereto, so as to cover the flat harness, or ferrite cores may be provided at both ends of the flat harness.

However, the cost of the flat harness increases if the flat harness includes the shield or the ferrite cores. As described above, the flat harness needs to bend flexibly. If the shield is provided for the flat harness, the shield will prevent the flat harness from flexing or bending, as the print head moves fast in the main scanning directions.

SUMMARY OF THE INVENTION

Accordingly, one aspect of the invention is to provide a data transfer device that transfers data, via a plurality of signal lines, and a printing apparatus including the data transfer device, in which emissions of radiant noises from the signal lines and crosstalk between signals are effectively prevented, without using a shield or a ferrite core.

To achieve this aspect, a data transfer device and a printing apparatus including the data transfer device of the invention may include a data transfer timing signal output device that outputs a timing signal for the data transfer, by changing the frequency of the timing signal randomly for each of the plurality of signal lines.

In the data transfer device and the printing apparatus including the data transfer device of the invention, the data transfer timing signal output device randomly changes at least one of a data transfer start timing and a data transfer end timing.

A data transfer device and a printing apparatus including the data transfer device of the invention transfers data using a system clock. The data transfer device and the printing apparatus may include a transfer clock generating device that generates a transfer clock that determines a timing for the data transfer, based on the system clock, and a transfer clock changing device that randomly changes a frequency of the transfer clock generated by the transfer clock generating device.

The transfer clock changing device randomly changes at least one of timings when the transfer clock makes a transition to a high level and when the transfer clock makes a transition to a low level.

A data transfer device and a printing apparatus including the data transfer device of the invention transfers data using a system clock. The data transfer device and the printing apparatus may include a transfer clock generating device that generates a transfer clock that determines a timing for the data transfer, based on the system clock, a delayed transfer clock generating device that shifts the transfer clock generated by the transfer clock generating device by a predetermined amount, to generate a plurality of delayed transfer clocks, and a delayed transfer clock selecting device that randomly selects one of the delayed transfer clocks generated by the delayed transfer clock generating device. The data transfer device transfers the data in accordance with the delayed transfer clock selected by the delayed transfer clock selecting device.

BRIEF DESCRIPTION OF THE DRAWINGS

A preferred embodiment of the invention will be described in detail with reference to the following figures wherein.

Further objects, details, and advantages of the invention will be apparent from the following detailed description, when read in conjunction with the drawings.

DETAILED DESCRIPTION OF PREFERRED EMBODIMENTS

Figure 1:
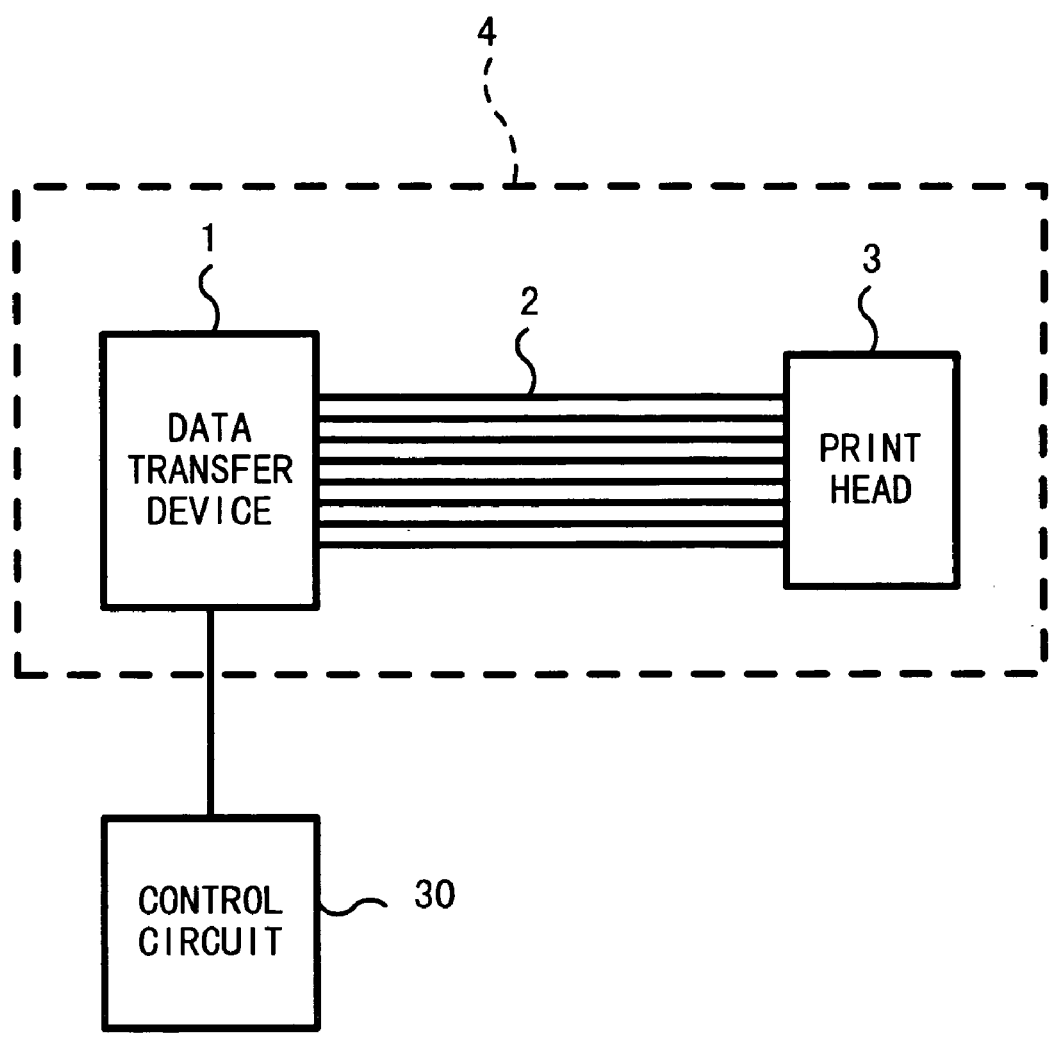
FIG. 1 is a block diagram of a print mechanism to which a data transfer device according to an embodiment of the invention is applied.

A preferred embodiment of the invention will be described with reference to the figures. FIG. 1 is a block diagram of a print mechanism 4 of a serial printer to which a data transfer device 1 according to an embodiment of the invention, is applied.

As shown in FIG. 1, the data transfer device 1 in the print mechanism 4 of the serial printer is connected to a print head 3, by a belt-like flat harness 2 having a plurality of signal lines arranged in parallel to each other. The flat harness 2 has copper signal wires, each of which are insulated by a flexible resin material, such as polyimide, which is formed in a flat thin shape.

The data transfer device 1, as shown in FIG. 1, is connected by wiring to a control circuit 30 for the serial printer, so that the data transfer device 1 may receive signals, such as data signals and clock signals for printing, from the control circuit 30. Based upon the data signals and the clock signals received from the control circuit 30, the data transfer device 1 provides drive signals to the print head 3, via the flat harness 2.

Various types of print heads to be used in a serial printer, such as an ink-jet type or wire-dot type, may be employed for the print head 3.

Figure 2:
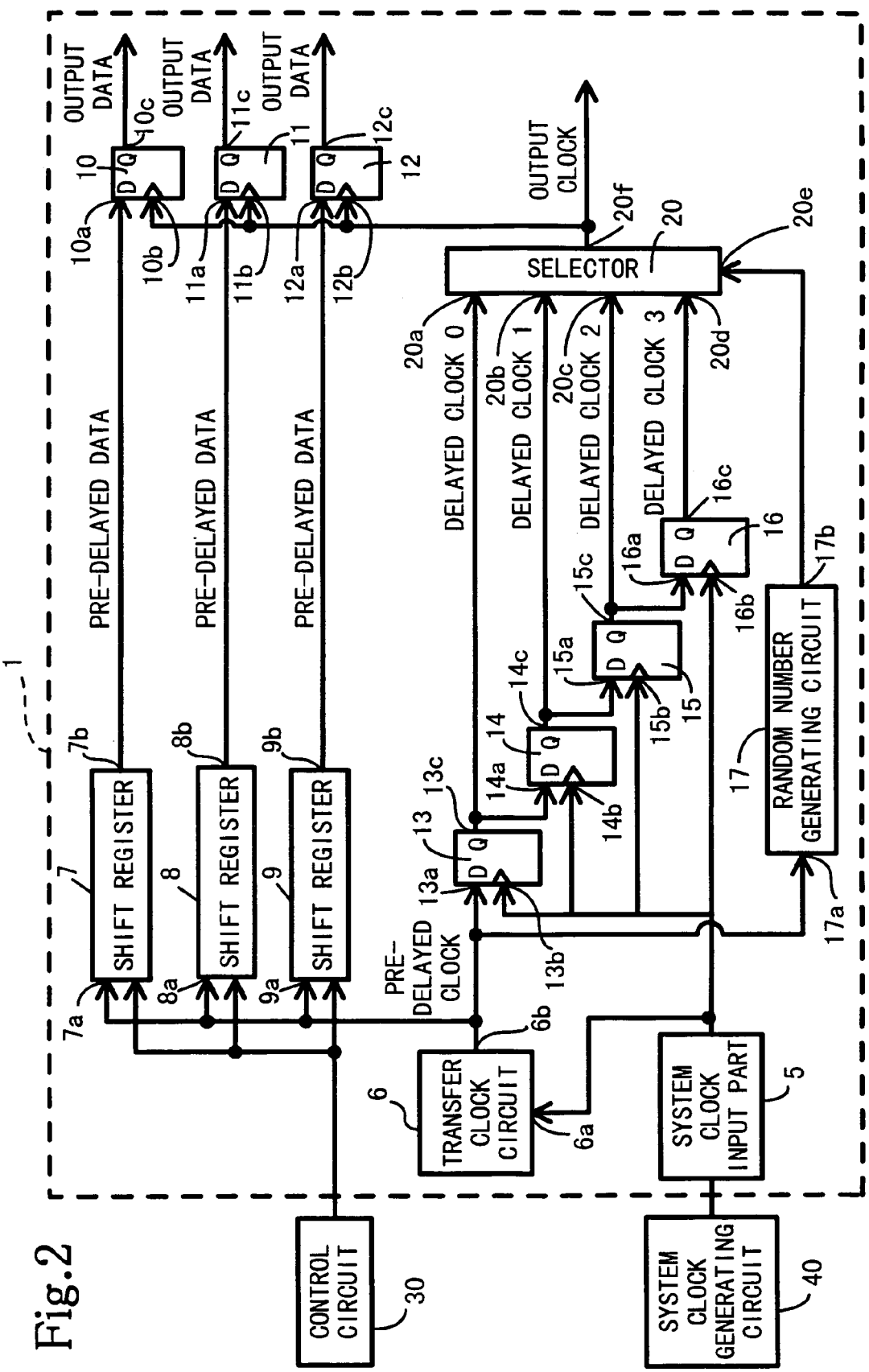
FIG. 2 is a block diagram of the data transfer device according to an embodiment of the invention.

Referring to FIG. 2, a circuit configuration of the data transfer device 1 will be described below. FIG. 2 is a block diagram for the data transfer device 1. In this embodiment, several print heads are provided. Each print head ejects ink of either cyan (C), magenta (M), yellow (Y) or black (K) color. Therefore, the serial printer according to the embodiment of the invention is provided with four data transfer devices. One data transfer device 1 out of the four will be explained in detail below.

As shown in FIG. 2, the data transfer device 1 includes a system clock input part 5 that inputs a system clock to be transmitted from a system clock generating circuit 40 in the main substrate (not shown). The system clock frequency is 48 MHz in this embodiment. However, the system clock frequency is not limited to 48 MHz but may be, for example, 66 MHz or 100 MHz.

The system clock input part 5 is connected to an input part 6*a* of a transfer clock circuit 6 that generates a transfer clock, which can be a timing signal for data transfer. The system clock input part 5 is also connected to each of clock terminals 13*b*, 14*b*, 15*b*, 16*b* of flip-flops 13, 14, 15, 16, respectively.

The system clock input to the system clock input part 5 from the system clock generating circuit 40 in the main substrate is input to the transfer clock circuit 6 and each of the clock terminals 13*b*, 14*b*, 15*b*, 16*b* of the flip-flops 13, 14, 15, 16, respectively.

The system clock input to the input part 6*a* of the transfer clock circuit 6 from the system clock input part 5 is frequency-divided to generate the transfer clock suitable for the data transfer. Such transfer clock is hereinafter referred to as the "pre-delayed clock" (see also FIG. 3). Then, the pre-delayed clock is output from an output part 6*b* of the transfer clock circuit 6.

The data transfer device 1 includes shift registers 7, 8, 9 that convert a parallel signal transmitted from the control circuit 30 of the main substrate, into a serial signal. The shift registers 7, 8, 9 are connected by wiring, to the control circuit 30. The three shift registers 7, 8, 9, as a group, output 3-bit color data.

The output part 6*b* of the transfer clock circuit 6 is connected to each of transfer clock input parts 7*a*, 8*a*, 9*a* provided for the shift registers 7, 8, 9, respectively. The pre-delayed clock generated by frequency-dividing the system clock in the transfer clock circuit 6 is output from the output part 6*b* of the transfer clock circuit 6, and input to each of the transfer clock input parts 7*a*, 8*a*, 9*a* of the shift registers 7, 8, 9, respectively. The shift registers 7, 8, 9 output from data output parts 7*b*, 8*b*, 9*b*, respectively, data converted from the parallel signal to the serial signal, in synchronization with the pre-delayed clock. The data output from the data output parts 7*b*, 8*b*, 9*b* is hereinafter referred to as the "pre-delayed data." Output data from each of output terminals 10*c*, 11*c*, 12*c* of flip-flops 10, 11, 12, which will be described in more detail below, is delayed data, as the timing of the data output from the output terminals 10*c*, 11 *c*, 12*c* is switched, based on the pre-delayed data and an output clock from a selector 20. In contrast to the output data from the output terminals 10*c*, 11*c*, 12*c*, which is the delayed data, the data output from the shift registers 7, 8, 9 is referred to as the pre-delayed data.

The data output part 7*b* of the shift register 7 is connected to an input terminal 10*a* of the flip-flop 10. Similarly, the data output part 8*b* of the shift register 8 is connected to an input terminal 11*a* of the flip-flop 11. The data output part 9*b* of the shift register 9 is connected to an input terminal 12*a* of the flip-flop 12.

Thus, the pre-delayed data output from the data output part 7*b* of the shift register 7 is input to the input terminal 10*a* of the flip-flop 10. Similarly, the pre-delayed data output from the data output part 8*b* of the shift register 8 is input to the input terminal 11*a* of the flip-flop 11. The pre-delayed data output from the data output part 9*b* of the shift register 9 is input to the input terminal 12*a* of the flip-flop 12.

The output part 6*b* of the transfer clock circuit 6 is connected to an input terminal 13*a* of the flip-flop 13 and an input terminal 17*a* of a random number generating circuit 17. Thus, the pre-delayed clock output from the output part 6*b* of the transfer clock circuit 6 is input to the input terminal 13*a* of the flip-flop 13 and the input terminal 17*a* of the random number generating circuit 17. The random number generating circuit 17 randomly generates the numbers of "0", "1", "2", or "3". The random number generated by the random number generating circuit 17 is output from an output terminal 17*b*, and input to a random number input terminal 20*e* of the selector 20.

An output terminal 13*c* of the flip-flop 13 is connected to an input terminal 20*a* of the selector 20 that selects the delayed clock, and to an input terminal 14*a* of the flip-flop 14. An output terminal 14*c* of the flop—flop 14 is connected to an input terminal 20*b* of the selector 20 and an input terminal 15*a* of the flop—flop 15. An output terminal 15*c* of the flip-flop 15 is connected to an input terminal 20*c* of the selector 20 and an input terminal 16*a* of the flip-flop 16. An output terminal 16*c* of the flip-flop 16 is connected to an input terminal 20*d* of the selector 20.

A clock output from the output terminal 13*c* of the flip-flop 13 (hereinafter referred to as the "delayed clock 0") is input to the input terminal 20*a* of the selector 20 and the input terminal 14*a* of the flip-flop 14. Similarly, a clock output from the output terminal 14*c* of the flip-flop 14 (hereinafter referred to as the "delayed clock 1") is input to the input terminal 20*b* of the selector 20 and the input terminal 15*a* of the flip-flop 15. A clock output from the output terminal 15*c* of the flip-flop 15 (hereinafter referred to as the "delayed clock 2") is input to the input terminal 20*c* of the selector 20 and the input terminal 16*a* of the flip-flop 16. A clock output from the output terminal 16*c* of the flip-flop 16 (hereinafter referred to as the "delayed clock 3") is input to the input terminal 20*d* of the selector 20.

As described above, the output terminal 17*b* of the random number generating circuit 17 is connected to the random number input terminal 20*e* of the selector 20. One of numbers of "0", "1", "2", or "3" generated by the random number generating circuit 17 is input to the selector 20. When one of the random numbers, for example, "0" is input to the selector 20, the delayed clock 0 is output from the output terminal 20*f* of the selector 20, as an output clock. When one of the random numbers, for example, "1" is input to the selector 20, the delayed clock 1 is output from the output terminal 20*f*, as an output clock. When one of the random numbers, for example, "2" is input to the selector 20, the delayed clock 2 is output from the output terminal 20*f*, as an output clock. When one of the random numbers, for example, "3" is input to the selector 20, the delayed clock 3 is output from the output terminal 20f, as an output clock. Every time one of random numbers generated by the random number generating circuit 17 is input to the selector 20, the delayed clock 0, 1, 2, or 3 corresponding to the input random numbers 0, 1, 2, or 3, is selectively output from the output terminal 20f of the selector 20.

The output terminal 20f of the selector 20 is connected to clock terminals 10b, 11b, 12b of the flip-flop 10, 11, 12, respectively. The output clock from the output terminal 20f of the selector 20 is input to the clock terminals 10b, 11b, 12b of the flip-flop 10, 11, 12, respectively. Data used by the print head 3 for printing (output data) is output from output terminals 10c, 11c, 12c of the flip-flop 10, 11, 12, respectively, at a timing in accordance with the output clock.

Figure 3:
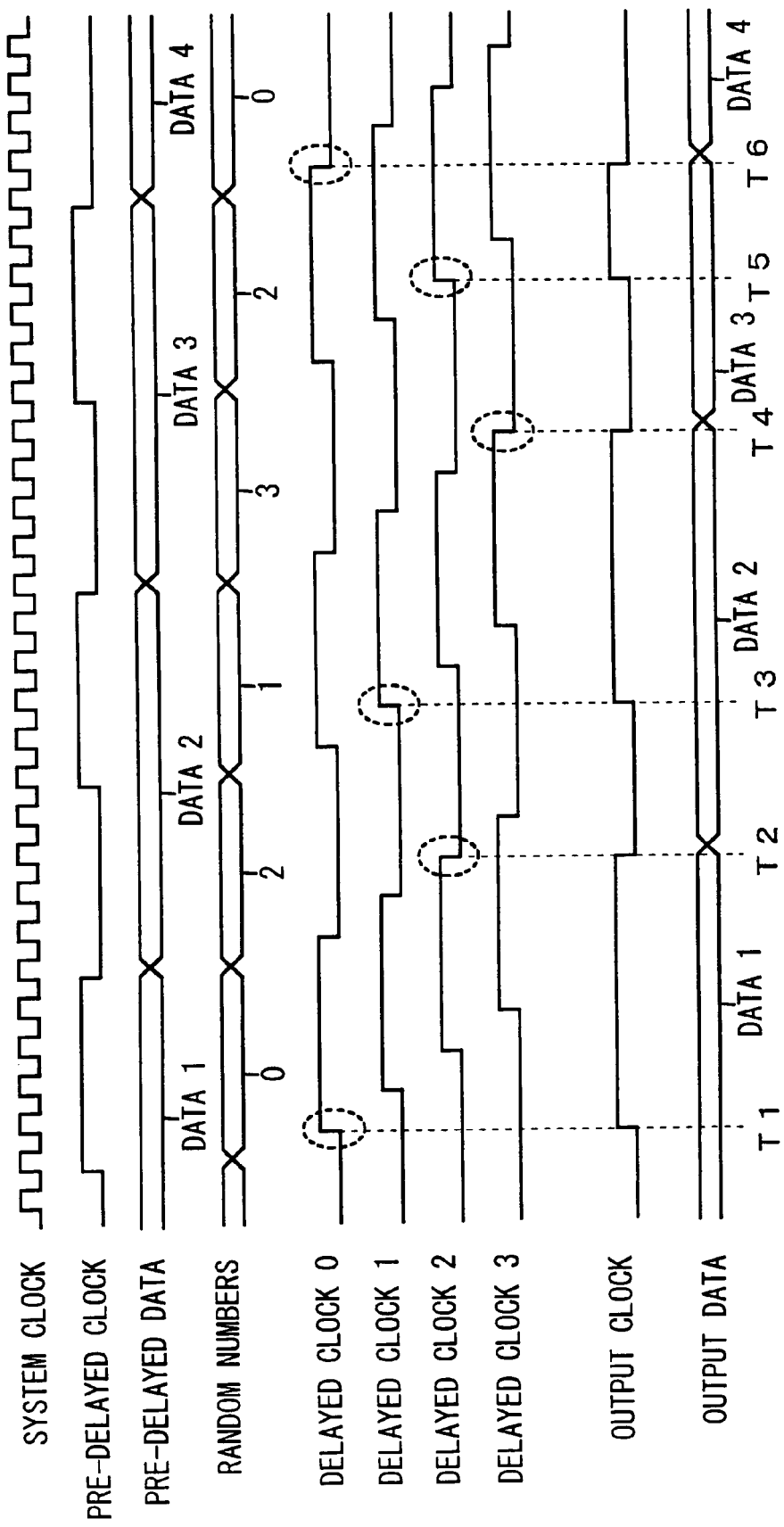
FIG. 3 is a timing chart illustrating the relationship between clocks and data in the data transfer device.

Referring to FIGS. 2 and 3, operations of the data transfer device 1 will be described below. FIG. 3 is a timing chart illustrating the relationship between clocks and data in the data transfer device 1. More specifically, FIG. 3 shows the relationship between data output from the shift register 7 regarding 1-bit print data and the clocks. The same relationship as shown in FIG. 3 may be applied when the data is output from the shift register 8 or 9, so that the explanation of the relationship between the data output from the shift registers 8,9 and the clocks is omitted.

When the system clock generating circuit 40 in FIG. 2 supplies a 48 MHz system clock (see FIG. 3) to the system clock input part 5, a system clock cycle becomes $1/(48\times10^6)$ seconds. The system clock is input to the transfer clock circuit 6 and the clock terminals 13b, 14b, 15b, 16b of the flip-flop 13, 14, 15, 16, respectively, as described above. The transfer clock circuit 6 performs 1/10 frequency division for the system clock, to generate the pre-delayed clock. The pre-delayed clock (see FIG. 2) with a cycle of $1/(48\times10^5)$ seconds are output from the output part 6b of the transfer clock circuit 6.

The parallel data input from the control circuit 30 is converted, by the shift registers 7, 8, 9, into the serial data, as described above. The pre-delayed data, which is the serial data, output from the shift register 7, is switched at a timing when the pre-delayed clock makes a transition from a HIGH level to a LOW level, as shown in FIG. 3. Every time the pre-delayed clock makes a transition from the HIGH level to the LOW level, the pre-delayed data is switched in an order of, for example, DATA 1, DATA 2, DATA 3, DATA 4, and so on, and output from the shift register 7. The data output from the shift register 7 is input to the input terminal 10a of the flop—flop 10. That is, the pre-delayed data to be output is switched every one cycle of the pre-delayed clock.

The random number generating circuit 17 randomly generates one of the random numbers from 0 to 3, at a timing when the pre-delayed clock output from the transfer clock circuit 6, makes a transition from the LOW level to the HIGH level and from the HIGH level to the LOW level. That is, the random numbers are switched every half a cycle of the pre-delayed clock.

As shown in FIGS. 2 and 3, when the HIGH level of the pre-delayed clock is input to the input terminal 13a of the flip-flop 13 from the transfer clock circuit 6, the HIGH level of the delayed clock 0 is output from the output terminal 13c of the flip-flop 13, at a timing when the system clock input from the clock terminal 13b, makes a transition to the HIGH level. As the pre-delayed clock input to the input terminal 13a becomes the LOW level, the LOW level of the delayed clock 0 is output from the output terminal 13c, at a timing when the system clock input from the clock terminal 13b, makes a transition to the HIGH level. The delayed clock 0 is delayed for one pulse of the system clock, with respect to the pre-delayed clock.

As shown in FIGS. 2 and 3, when the HIGH level of the delayed clock 0 is input to the input terminal 14a of the flip-flop 14 from the output terminal 13c of the flip-flop 13, the HIGH level of the delayed clock 1 is output from the output terminal 14c of the flip-flop 14, at a timing when the system clock input from the clock terminal 14b, makes a transition to the HIGH level. As the pre-delayed clock 0 input to the input terminal 14a becomes the LOW level, the LOW level of the delayed clock 1 is output from the output terminal 14c, at a timing when the system clock input from the clock terminal 14b, makes a transition to the HIGH level. The timing when the delayed clock 1 makes a transition to the HIGH level or to the LOW level is delayed for one pulse of the system clock, with respect to the delayed clock 0, and is delayed for two pulses of the system clock, with respect to the pre-delayed clock.

Also, as shown in FIGS. 2 and 3, when the HIGH level of the delayed clock 1 is input to the input terminal 15a of the flip-flop 15 from the output terminal 14c of the flip-flop 14, the HIGH level of the delayed clock 2 is output from the output terminal 15c of the flip-flop 15, at a timing when the system clock input from the clock terminal 15b, makes a transition to the HIGH level. As the pre-delayed clock 1 input to the input terminal 15a becomes the LOW level, the LOW level of the delayed clock 2 is output from the output terminal 15c, at a timing when the system clock input from the clock terminal 15b, makes a transition to the HIGH level. The timing when the delayed clock 2 makes a transition to the HIGH level or to the LOW level, is delayed for one pulse of the system clock, with respect to the delayed clock 1, and is delayed for three pulses of the system clock, with respect to the pre-delayed clock.

Similarly, as shown in FIGS. 2 and 3, when the HIGH level of the delayed clock 2 is input to the input terminal 16a of the flip-flop 16 from the output terminal 16c of the flip-flop 15, the HIGH level of the delayed clock 3 is output from the output terminal 16c of the flip-flop 16, at a timing when the system clock input from the clock terminal 16b, makes a transition to the HIGH level. As the pre-delayed clock 2 input to the input terminal 16a becomes the LOW level, the LOW level of the delayed clock 3 is output from the output terminal 16c, at a timing when the system clock input from the clock terminal 16b, makes a transition to the HIGH level. The timing when the delayed clock 3 makes a transition to the HIGH level or to the LOW level, is delayed for one pulse of the system clock, with respect to the delayed clock 2, and is delayed for four pulses of the system clock, with respect to the pre-delayed clock.

When one of the random numbers, for example, "0" is input from the random number generating circuit 17 to the random number input terminal 20e of the selector 20, the delayed clock 0 is output from the output terminal 20f of the selector 20, as an output clock. Similarly, when one of the random numbers, for example, "1" is input from the random number generating circuit 17 to the random number input terminal 20e of the selector 20, the delayed clock 1 is output from the output terminal 20f of the selector 20, as an output clock. When one of the random numbers, for example, "2" is input from the random number generating circuit 17 to the random number input terminal 20e of the selector 20, the delayed clock 2 is output from the output terminal 20f of the selector 20, as an output clock. When one of the random numbers, for example, "3" is input from the random number generating circuit 17 to the random number input terminal 20e of the selector 20, the delayed clock 3 is output from the output terminal 20f of the selector 20, as an output clock.

When the random numbers are randomly switched every half a cycle of the pre-delayed clock, for example, from "0" to "2", then "1", then "3", then "2", and then "0", such as shown in FIG. 3, the clock output from the output terminal 20f of the selector 20 is switched accordingly from the delayed clock 0 to the delayed clock 2, then the delayed clock 1, then the delayed clock 3, then the delayed clock 2, and then the delayed clock 0. Accordingly, the timing, which is circled with the dashed lines in FIG. 3, when the delayed clocks 0 to 3 make a transition to the HIGH level or the LOW level, are combined. Waveform of the output clock from the output terminal 20f of the selector 20 becomes such as shown in FIG. 3. That is, the level at a timing T1 is HIGH, that at the timing T2 is LOW, that at the timing T3 is HIGH, that at the timing T4 is LOW, that at the timing T5 is HIGH, and that at the timing T6 is LOW. Thus, the cycle of the output clock becomes random.

As shown in FIGS. 2 and 3, when the output clock input to the clock terminal 10b of the flip-flop 10 from the output terminal 20f of the selector 20 makes a transition from the HIGH to the LOW level at the timing of T2, after the DATA 1 of the pre-delayed data, input from the shift register 7 to the input terminal 10a of the flip-flop 10, is switched to DATA 2, DATA 1 of the output data, to be output from the output terminal 10c of the flip-flop 10, is switched to DATA 2.

When the output clock input to the clock terminal 10b of the flip-flop 10 from the output terminal 20f of the selector 20 makes a transition from the HIGH to the LOW level at the timing of T4, after the DATA 2 of the pre-delayed data, input from the shift register 7 to the input terminal 10a of the flip-flop 10, is switched to DATA 3, DATA 2 of the output data, to be output from the output terminal 10c of the flip-flop 10, is switched to DATA 3.

When the output clock input to the clock terminal 10b of the flip-flop 10 from the output terminal 20f of the selector 20 makes a transition from the HIGH to the LOW level at the timing of T6, after the DATA 3 of the pre-delayed data, input from the shift register 7 to the input terminal 10a of the flip-flop 10, is switched to DATA 4, DATA 3 of the output data, to be output from the output terminal 10c of the flip-flop 10, is switched to DATA 4.

As described above, in the data transfer device 1, the selector 20 selectively outputs the delayed clock 0, 1, 2, or 3, according to numbers randomly output from the random number generating circuit 17. Accordingly, the timing when the output clock output from the data transfer device 1 to the flat harness 2 makes a transition to the HIGH level or to the LOW level is delayed randomly for any of one to four pulse(s) of the system clock, as compared with the pre-delayed clock output from the transfer clock circuit 6. Consequently, the timing when the output clock output from the data transfer device 1 to the flat harness 2 makes a transition to the HIGH level or to the LOW level becomes random without becoming a specific cycle. With the above-described structure, an energy density at some frequency of electromagnetic wave radiated from the flat harness 2 is not raised, so that the radiant noises and crosstalk may be reduced.

The timing when the output data output from the output terminal 10c of the flip-flop 10 in the data transfer device 1 to the flat harness 2 is switched is delayed randomly for any of one to four pulse(s) of the system clock, as compared with the pre-delayed data output from the shift register 7. The timing when the output data to be output from the data transfer device 1 to the flat harness 2 is switched, becomes random without becoming a specific cycle.

In the above-described embodiment, the pre-delayed data and the output data output from the shift register 7 is described. However, the same principle may be applied to the pre-delayed data and the output data output from the shift registers 8, 9, as described above.

The above embodiment is described with the data transfer device 1 which is applied to a serial printer, as an example, that transfers serial signals. However, the data transfer device 1 may be applied to an apparatus that transfers parallel signals. The data transfer device 1 may be applied to various apparatuses, other than printers, that transfer digital data.

In the above embodiment, the reduction of the radiant noise and the crosstalk in the flat harness 2 is described. However, the invention may be applied to various types of harnesses and cables other than the flat harness. If the invention is applied to a harness or a cable that is provided with a shield, the reduction of the radiant noises and the crosstalk is more expected. The invention is not restricted to the flat harness, but may also be applied to various substrates and apparatus to reduce the radiant noise and the crosstalk therein. If the invention is applied to a single signal line, the radiant noise may be reduced.

While the invention has been described with reference to the embodiment, it is to be understood that the invention is not restricted to the particular forms shown in the foregoing embodiments. Various modifications and alterations can be made thereto without departing from the scope of the invention.

For example, the random numbers generated by the random number generating circuit 17 is not limited to 0 to 3. The delayed clock is not limited to four, but any numbers. That is, when at least two random numbers are generated by the random number generating circuit 17, the effects of the invention may be obtained.

The random numbers from 0 to 3 are generated in the above-described embodiment. However, not all the random numbers may be used. For example, the random number generating circuit 17 is structured so as to generate the random numbers from 0 to 3. By changing settings of the random number generating circuit 17, the random numbers to be generated may be limited to "0" and "1" or may be limited to "0", "1", and "2".

When the settings of the random number generating circuit 17 are changed to limit to one number, for example, "0" or "1", the data is transferred as is done conventionally. In this case, the effects of the invention is not expected.

The above-described circuits may be included in an IC chip of an application-specific integrated circuit (ASIC).

As is apparent from the foregoing description, in the data transfer device and a printing apparatus including the data transfer device of the invention, a data transfer timing signal output device may output a timing signal for data transfer by changing a frequency of the timing signal randomly for each of the plurality of signal lines. Therefore, an energy density at some frequency of electromagnetic wave radiated from the signal lines is not raised. Thus, the radiant noises and the crosstalk may be reduced.

As shown in FIGS. 2 and 3, when the HIGH level of the pre-delayed clock is input to the input terminal 13a of the flip-flop 13 from the transfer clock circuit 6, the HIGH level of the delayed clock 0 is output from the output terminal 13c of the flip-flop 13, at a timing when the system clock input from the clock terminal 13b, makes a transition to the HIGH level. As the pre-delayed clock input to the input terminal 13a becomes the LOW level, the LOW level of the delayed clock 0 is output from the output terminal 13c, at a timing when the system clock input from the clock terminal 13b, makes a transition to the HIGH level. The delayed clock 0 is delayed for one pulse of the system clock, with respect to the pre-delayed clock.

As shown in FIGS. 2 and 3, when the HIGH level of the delayed clock 0 is input to the input terminal 14a of the flip-flop 14 from the output terminal 13c of the flip-flop 13, the HIGH level of the delayed clock 1 is output from the output terminal 14c of the flip-flop 14, at a timing when the system clock input from the clock terminal 14b, makes a transition to the HIGH level. As the pre-delayed clock 0 input to the input terminal 14a becomes the LOW level, the LOW level of the delayed clock 1 is output from the output terminal 14c, at a timing when the system clock input from the clock terminal 14b, makes a transition to the HIGH level. The timing when the delayed clock 1 makes a transition to the HIGH level or to the LOW level is delayed for one pulse of the system clock, with respect to the delayed clock 0, and is delayed for two pulses of the system clock, with respect to the pre-delayed clock.

Also, as shown in FIGS. 2 and 3, when the HIGH level of the delayed clock 1 is input to the input terminal 15a of the flip-flop 15 from the output terminal 14c of the flip-flop 14, the HIGH level of the delayed clock 2 is output from the output terminal 15c of the flip-flop 15, at a timing when the system clock input from the clock terminal 15b, makes a transition to the HIGH level. As the pre-delayed clock 1 input to the input terminal 15a becomes the LOW level, the LOW level of the delayed clock 2 is output from the output terminal 15c, at a timing when the system clock input from the clock terminal 15b, makes a transition to the HIGH level. The timing when the delayed clock 2 makes a transition to the HIGH level or to the LOW level, is delayed for one pulse of the system clock, with respect to the delayed clock 1, and is delayed for three pulses of the system clock, with respect to the pre-delayed clock.

Similarly, as shown in FIGS. 2 and 3, when the HIGH level of the delayed clock 2 is input to the input terminal 16a of the flip-flop 16 from the output terminal 16c of the flip-flop 15, the HIGH level of the delayed clock 3 is output from the output terminal 16c of the flip-flop 16, at a timing when the system clock input from the clock terminal 16b, makes a transition to the HIGH level. As the pre-delayed clock 2 input to the input terminal 16a becomes the LOW level, the LOW level of the delayed clock 3 is output from the output terminal 16c, at a timing when the system clock input from the clock terminal 16b, makes a transition to the HIGH level. The timing when the delayed clock 3 makes a transition to the HIGH level or to the LOW level, is delayed for one pulse of the system clock, with respect to the delayed clock 2, and is delayed for four pulses of the system clock, with respect to the pre-delayed clock.

What is claimed is:

1. A data transfer device that transfers data, via a plurality of signal lines, comprising:
    a data transfer timing signal output device that outputs a random timing signal for the data transfer, by changing a frequency of the timing signal randomly for the plurality of signal lines without becoming a specific cycle, so as to delimit an energy density in the plurality of signal lines, wherein the data transfer timing signal output device randomly changes at least one of a data transfer start timing and a data transfer end timing.

2. The data transfer device according to claim 1, wherein a flat harness connects the data transfer device to another device to which the data is transferred.

3. A data transfer device that transfers data using a system clock, comprising:
    a transfer clock generating device that generates a transfer clock that determines a timing for the data transfer, based on the system clock; and
    a transfer clock changing device that randomly changes a frequency of the transfer clock generated by the transfer clock generating device, to randomly change the transfer of data through a plurality of signal lines without becoming a specific cycle, so as to delimit an energy density in the plurality of signal lines, wherein the transfer clock changing device randomly changes at least one of a timing for the transfer clock to make a transition to a high level and a timing for the transfer clock to make a transition to a low level.

4. The data transfer device according to claim 3, wherein the plurality of signal lines is a flat harness that connects the data transfer device to another device to which the data is transferred.

5. A data transfer device that transfers data using a system clock, comprising:
    a transfer clock generating device that generates a transfer clock that determines a timing for the data transfer, based on the system clock;
    a delayed transfer clock generating device that shifts the transfer clock generated by the transfer clock generating device by a predetermined amount, to generate a plurality of delayed transfer clocks; and
    a delayed transfer clock selecting device that randomly selects one of the delayed transfer clocks generated by the delayed transfer clock generating device to randomly change the transfer of data through a plurality of signal lines without becoming a specific cycle, so as to delimit an energy density in the plurality of signal lines,
    wherein the data transfer device transfers the data randomly changing at least one of a data transfer start timing and a data transfer end timing in accordance with the delayed transfer clock selected by the delayed transfer clock selecting device.

6. The data transfer device according to claim 5, wherein the plurality of signal lines is a flat harness that connects the data transfer device to another device to which the data is transferred.

7. A printing apparatus including a data transfer device that transfers print data to a print head, via a plurality of signal lines, comprising:
    a data transfer timing signal output device that outputs a random timing signal for the data transfer, by changing a frequency of the timing signal randomly for the plurality of signal lines without becoming a specific cycle, so as to delimit an energy density in the plurality of signal lines, wherein the data transfer timing signal output device randomly changes at least one of a data transfer start timing and a data transfer end timing.

8. The printing apparatus according to claim 7, wherein a flat harness connects the data transfer device to the print head.

9. A printing apparatus including a data transfer device that transfers print data to a print head, using a system clock, comprising:
    a transfer clock generating device that generates a transfer clock that determines a timing for print data transfer, based on the system clock; and a transfer clock changing device that randomly changes a frequency of the transfer clock generated by the transfer clock generating device to randomly change the transfer of data a plurality of signal lines without becoming a specific cycle, so as to delimit an energy density in the plurality of signal lines, wherein the data transfer device transfers the print data to the print head, based on the transfer clock whose frequency is randomly changed by the transfer clock changing device, wherein the transfer clock changing device randomly changes at least one of a timing for the transfer clock to make a transition to a high level and a timing for the transfer clock to make a transition to a low level.

10. The printing apparatus according to claim 9, wherein a flat harness connects the data transfer device to the print head.

11. A printing apparatus including a data transfer device that transfers print data to a print head, using a system clock, comprising:

a transfer clock generating device that generates a transfer clock that determines a timing for the data transfer, based on the system clock;

a delayed transfer clock generating device that shifts the transfer clock generated by the transfer clock generating device by a predetermined amount, to generate a plurality of delayed transfer clocks; and a delayed transfer clock selecting device that randomly selects one of the delayed transfer clocks generated by the delayed transfer clock generating device to randomly change the transfer of data through a plurality of signal lines without becoming a specific cycle, so as to delimit an energy density in the plurality of signal lines, wherein the data transfer device transfers the print data to the print head randomly changing at least one of a data transfer start timing and a data transfer end timing in accordance with the delayed transfer clock selected by the delayed transfer clock selecting device.

12. The printing apparatus according to claim 11, wherein a flat harness connects the data transfer device to the print head.

13. A method of reducing radiant noises in a plurality of signal lines during the transfer of data, comprising:

generating a transfer clock that determines a timing for the data transfer;

shifting the transfer clock by a predetermined amount to generate a plurality of delayed transfer clocks;

randomly selecting one of the delayed transfer clocks; and transferring the data randomly changing at least one of a data transfer start timing and a data transfer end timing in accordance with the randomly selected delayed transfer clock without becoming a specific cycle, so as to delimit an energy density in the plurality of signal lines.

* * * * *